Sept. 3, 1968 J. E. WALDRUM ETAL 3,399,638
AGRICULTURAL SPRAY DEVICE
Filed June 23, 1967 6 Sheets-Sheet 1

INVENTORS.
JOHN E. WALDRUM
PAUL W. BISHOP
BY
Caesar, Rivise, Bernstein and Cohen
ATTORNEYS.

Sept. 3, 1968   J. E. WALDRUM ET AL   3,399,638
AGRICULTURAL SPRAY DEVICE

Filed June 23, 1967   6 Sheets-Sheet 2

INVENTORS.
JOHN E. WALDRUM
PAUL W. BISHOP
BY
Caesar, Rivise, Bernstein & Cohen
ATTORNEYS.

Sept. 3, 1968  J. E. WALDRUM ET AL  3,399,638
AGRICULTURAL SPRAY DEVICE
Filed June 23, 1967  6 Sheets-Sheet 3
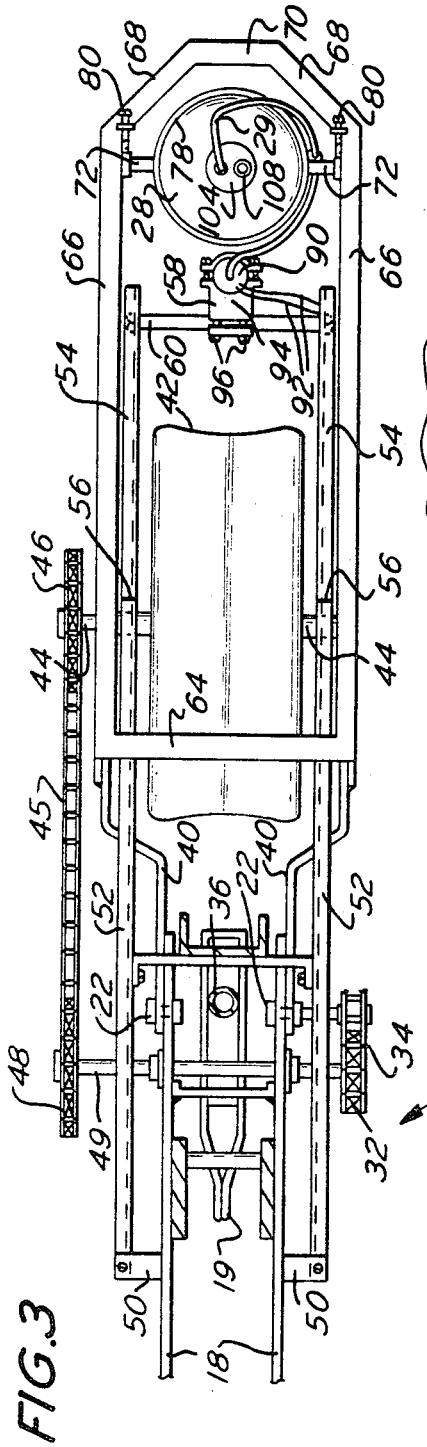
INVENTORS.
JOHN E. WALDRUM
PAUL W. BISHOP
BY
Caesar, Rivise, Bernstein & Cohen
ATTORNEYS.

Sept. 3, 1968  J. E. WALDRUM ET AL  3,399,638
AGRICULTURAL SPRAY DEVICE
Filed June 23, 1967  6 Sheets-Sheet 4

INVENTORS.
JOHN E. WALDRUM
PAUL W. BISHOP
BY
Caesar, Rivise, Bernstein & Cohen
ATTORNEYS.

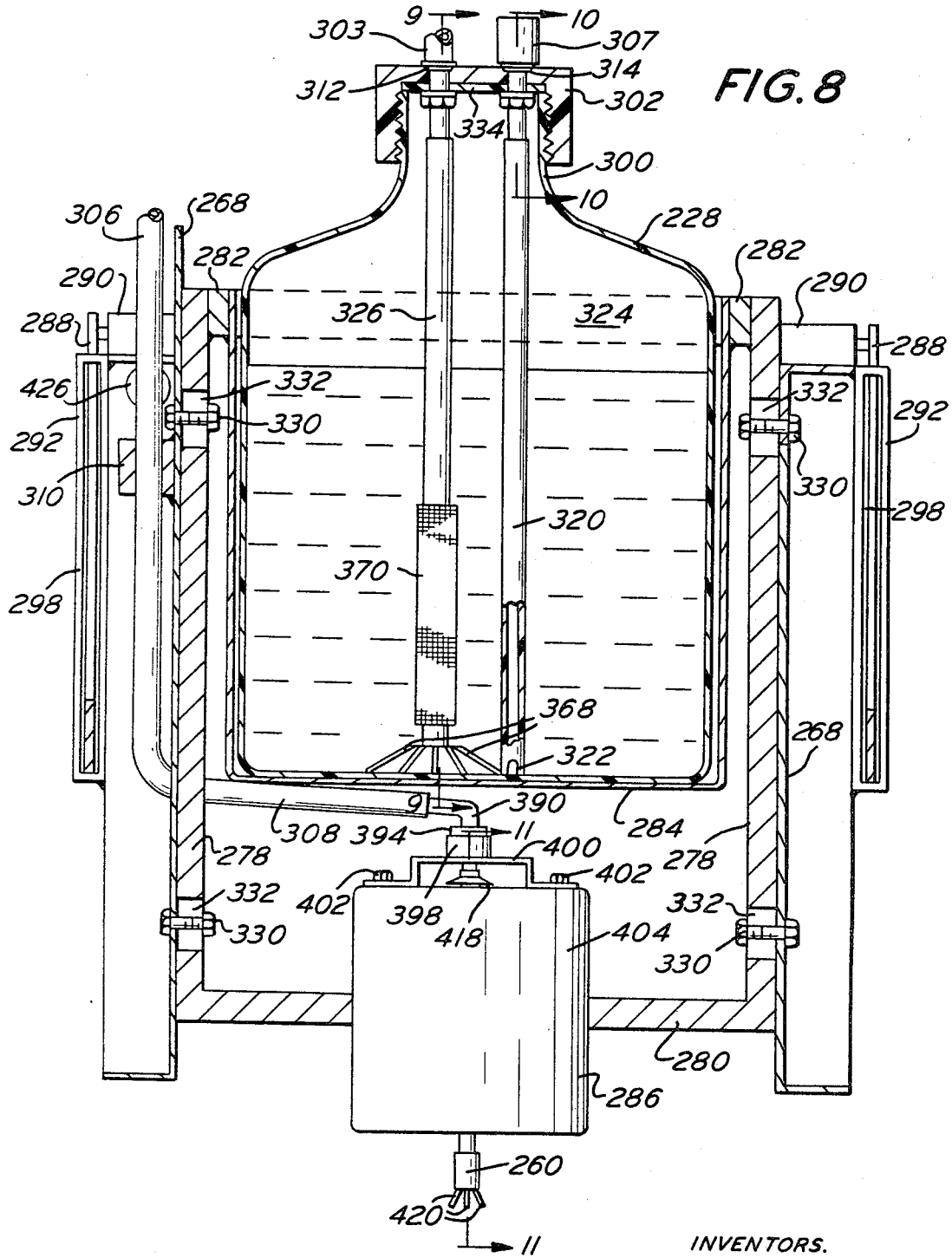

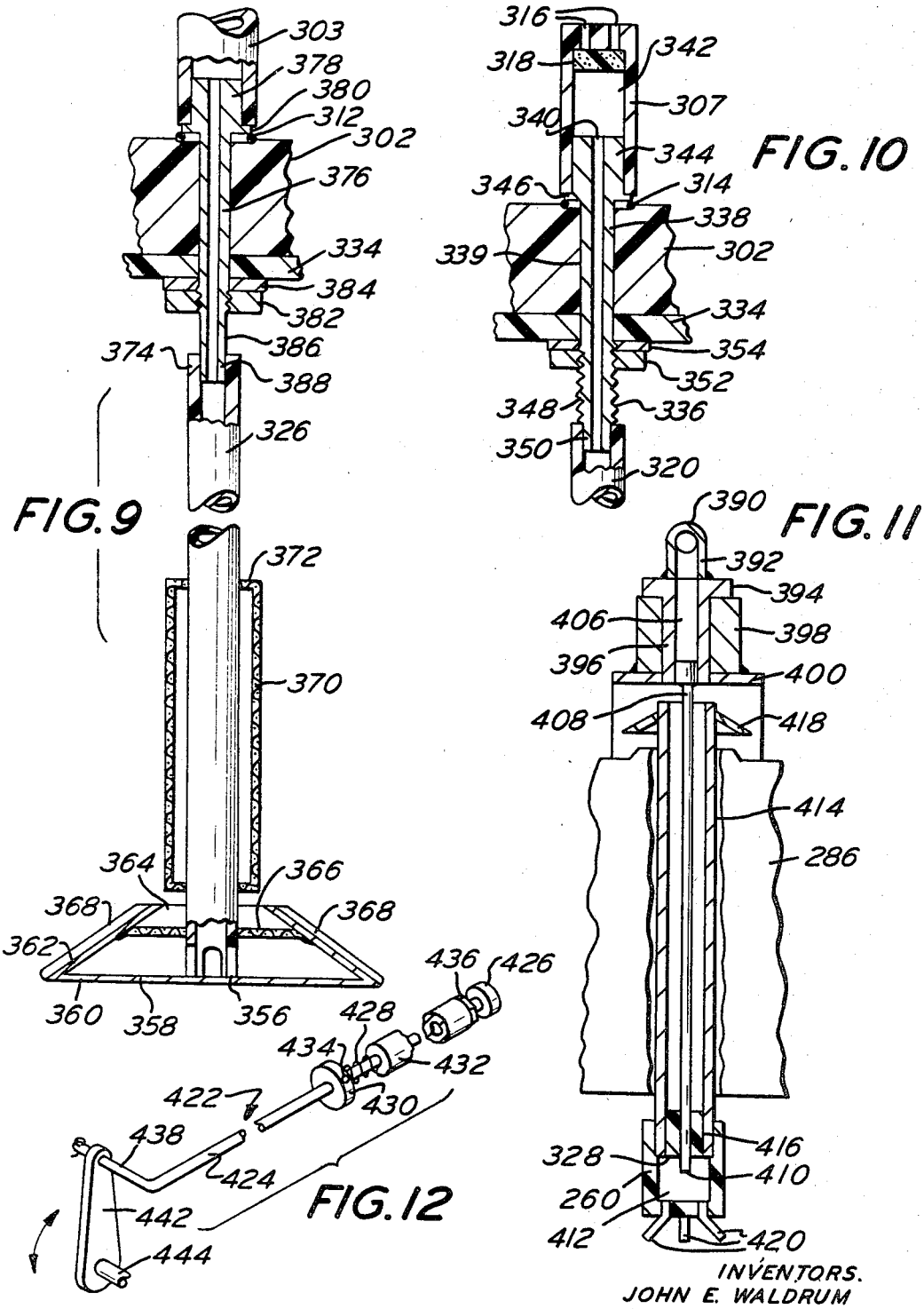

United States Patent Office 3,399,638
Patented Sept. 3, 1968

3,399,638
AGRICULTURAL SPRAY DEVICE
John E. Waldrum, Ambler, and Paul W. Bishop, Telford, Pa., assignors to Amchem Products, Inc., Ambler, Pa., a corporation of Delaware
Filed June 23, 1967, Ser. No. 648,462
9 Claims. (Cl. 111—6)

ABSTRACT OF THE DISCLOSURE

A low volume agricultural liquid spray device including a reservoir for the liquid to be sprayed and feed means to deliver the liquid under constant head via a conduit to a spindle having a bore to define a flow path and spray means depending from the spindle, drive means to rotate the spindle at a pre-determined rate about its axis with said spray means also being rotated at a pre-determined rate to dispense low volumes of the agricultural liquid in a relatively coarse spray, but in a uniform manner.

SPECIFICATION

This invention is concerned with the agricultural spray application of low volumes of liquid. More particularly, this invention is concerned with the agricultural spray application of materials in low volumes of liquid carriers, for example the application of herbicide concentrates in low volumes of water or organic solvent.

The spraying of herbicides, and particularly systemic herbicides, usually occurs with the herbicides being used in a dilute form. While a dilute spray insures a fairly uniform coverage, it does require the handling of large volumes of liquid which considerably adds to the expense of the spray operation. Furthermore, with systemic herbicides there is the problem of drift, especially where large volumes of the heribicides are being applied. This is because systemic herbicides are so effective that even a relatively few drops of dilute spray can inflict harm upon a plant. The spraying of low volumes of a liquid usually entails the formation of many fine particles in an atomizing spray. Such fine particles are more susceptible to air currents and drafts and thus there is a greater chance that the systemic herbicide spray will be carried to unwanted areas to do considerable damage.

Concentrates of herbicides are not usually directly sprayed onto weeds because it is not possible with the known spraying devices to accurately control the rate of application. Clearly, if too little of the herbicide is applied, no herbicidal effect will be achieved while if too much herbicide is applied, the excess is not only wasted but it can have an adverse effect on the crops in the areas from which the weeds are to be eradicated.

Because of this, it is necessary to apply herbicide concentrates in dilute form, customarily in large volumes of liquid carrier, usually water, often of the order of 200 gallons per acre. However, the large volume application technique, while offering better control of the rate of application, also has its disadvantages: thus repeated recourse to a water supply is necessary and large equipment is also needed.

In practice, the farmer receives a herbicide concentrate to dilute with water for application by spraying to the soil. Where the herbicide is not adequately water-soluble, it must be formulated so that the farmer can readily mix it with water. The formulation of herbicides to render them water-soluble or emulsifiable can either take place during manufacture or the work must be left to the farmer himself. It follows, therefore, that intricate steps are necessary before the farmer can actually get on with the job of spraying the herbicide onto the weeds.

Further, when spraying high volumes of liquid at high pressures, there is a danger of drift onto neighboring areas of land which can contain growing crops. It is known in the insecticidal art to spray low volumes of insecticide in mist form but clearly there possible drift is no real danger.

All in all therefore, while the direct application of herbicidal concentrates to the soil is desired, no device has yet been built by which it may be accurately applied solely to the area to be treated in low volume. By the term "low volume," is meant of the order of one-half to two or more gallons per acre provided that the herbicide when sprayed onto the soil is in the form of discrete uniform droplets.

It is an object of this invention to provide an apparatus by which low volumes of liquid, especially herbicide concentrates in low volumes of liquid carrier, for example water or organic solvent, can be dispensed accurately onto the soil by spraying.

According to this invention, there is provided a device for the low volume spray of a liquid comprising in combination:

a reservoir for the liquid to be sprayed;
feed means to deliver the liquid to be sprayed from the reservoir at a constant rate;
a spindle having a bore therein to define a flow path for the liquid from the feed means;
drive means to rotate the spindle at a pre-determined rate; and
spray means depending from the spindle to spray the liquid.

It is possible with the device of this invention to spray low volumes of herbicides onto soil to successfully eradicate weeds. Moreover, while it is possible to formulate herbicide concentrates in water as has been done before, the ability to spray a concentrate in a low volume of a carrier makes it possible for the first time to spray a concentrate in an organic solvent, for example acetone or methylpyrollidone. The use of organic solvents has hitherto been avoided because of the prohibitive costs of such solvents in large volumes—in providing a means for applying a herbicide concentrate in organic solution in low volumes, the cost becomes considerably less and this represents a great advance in the art, because many of the herbicidal concentrates are more readily soluble in an organic solvent than in water.

It is on occasion necessary or desirable to curtail the supply of the liquid being sprayed, for example to avoid spraying herbicide on to a position at which it is not wanted. For this purpose, it is preferred to incorporate in the device of this invention a valve between the delivery means and the spindle. Preferably, the valve means is a quick-acting positive-closing valve. Specific instances of appropriate valve means are given hereinafter.

While the device of this invention may be used to spray low volume herbicide concentrates or other agricultural liquid to the soil on its own, it is more economical to carry out such a spray operation simultaneously with another or other agricultural operations. Preferably, the low volume spray application is carried out at the time of planting, and therefore the device of this invention is preferably mounted on a conventional planting device. Advantageously, the device is so mounted upon the planter that spraying only occurs when the planter is itself in operation, the spray device being inoperative when the planter is not working.

It is, therefore, an object of the present invention to provide an agricultural spray device with reliable constant head means in order to achieve a uniform discharge rate.

Yet another object of the present invention is to provide an agricultural spray device which avoids the necessity of handling large volumes of dilute herbicides and the attendant problem of drift.

Still another object of the present invention is to provide an agricultural spray device which handles low volumes but produces a relatively coarse spray.

The foregoing as well as other objects of the invention are achieved by providing an agricultural spray device including a reservoir for the concentrated liquid and a spray means with a conduit connecting the reservoir to the spray means and constant head means to maintain the rate of discharge from the spray head at a pre-determined rate. In the preferred embodiment of the invention, the spray means is rotated by drive means with the liquid being delivered under constant head into a rotating hollow spindle to which is connected the rotating spray means and then discharged from the rotating spray head. Also in the preferred form of the invention, the feed means is disposed in the rotational axis of the spindle. Also, the spray device of the present invention is secured upon a planter so that discharge of liquid is prevented when the planter shoe is lifted from the ground.

Other objects and many of the attendant advantages of this invention will be readily appreciated as the same becomes better understood by reference to the following detailed description when considered in connection with accompanying drawings wherein:

FIG. 3 is an enlarged view partly in section taken along the line 3—3 of FIG. 1A;

FIG. 4 is an enlarged fragmentary sectional view taken along the line 4—4 of FIG. 1A;

FIG. 5 is an enlarged fragmentary sectional view taken along the line 5—5 of FIG. 2;

FIG. 8 is an enlarged sectional view taken along the line 8—8 of FIG. 7;

FIG. 9 is an enlarged fragmentary sectional view taken along the line 9—9 of FIG. 8;

FIG. 10 is an enlarged fragmentary sectional view taken along the line 10—10 of FIG. 8;

FIG. 11 is an enlarged fragmentary sectional view taken along the line 11—11 of FIG. 8; and FIG. 12 is a fragmentary perspective view showing details of the linkage connection of a shut-off mechanism which runs from the herbicide delivery hose forwardly for actuation by movement of the planter frame.

Figure 1:
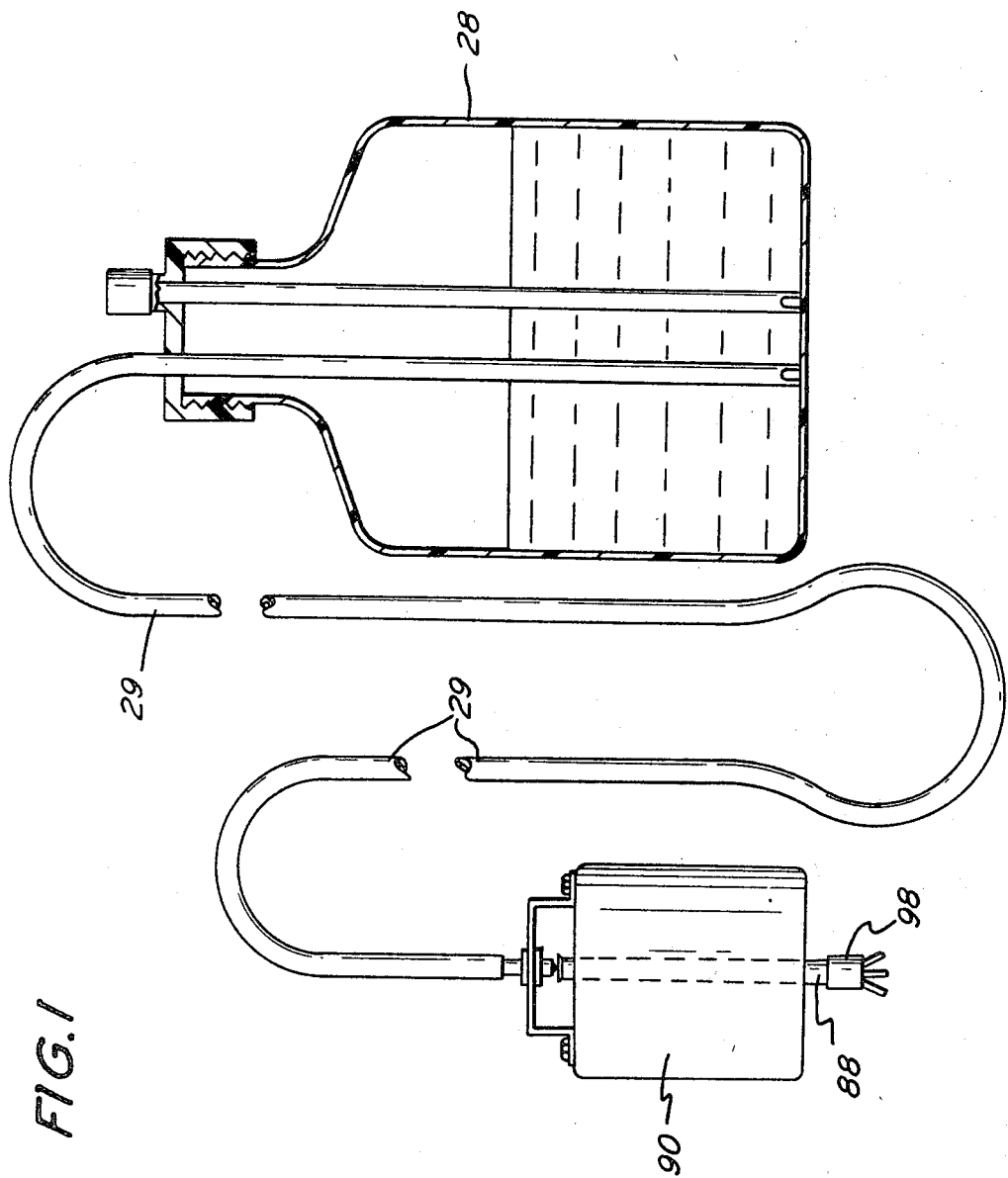
FIG. 1 is a partially schematic view showing the basic assembly of the present invention.
Figure 1A:
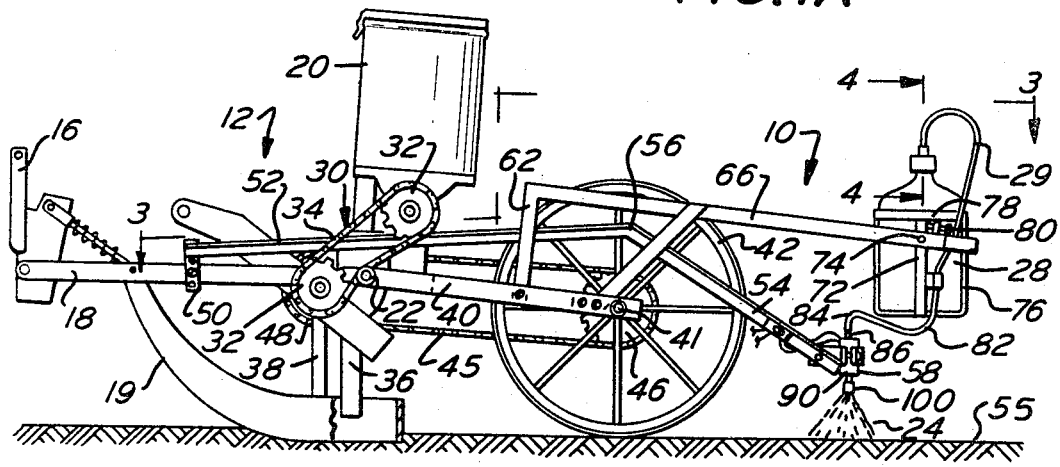
FIG. 1A is a side elevational view with certain portions broken away for the sake of clarity of a conventional planter fitted with a concentrated herbicide spray device constituting a first embodiment of the present invention, with the planter being pulled along the ground such that the spray device of the present invention is in operation.

Referring now in greater detail to the various figures of the drawing, wherein like reference characters refer to like parts, there is shown generally at 10 in FIG. 1A a concentrated agricultural spray device constituting a first embodiment of the present invention which for the sake of illustration is mounted upon a conventional planter device.

The various details of the concentrated agricultural spray device itself are shown in FIG. 1.

In particular these details include a tank or reservoir 28 which holds the liquid to be sprayed. Feed means 29 in the form of a conduit are provided in order to deliver the liquid to be sprayed from the reservoir 28.

As will be discussed in greater detail hereinafter, the liquid delivered through the feed means will be under a constant head in order that a pre-determined spray rate will be held. As further shown in FIG. 1 the feed means 29 deliver the agricultural liquid to a spindle 88 that extends within the drive means or motor 90. As will be discussed in connection with the other figures of the drawing, the spindle has a bore to define a flow path for the liquid from the feed means 29.

Figure 2:
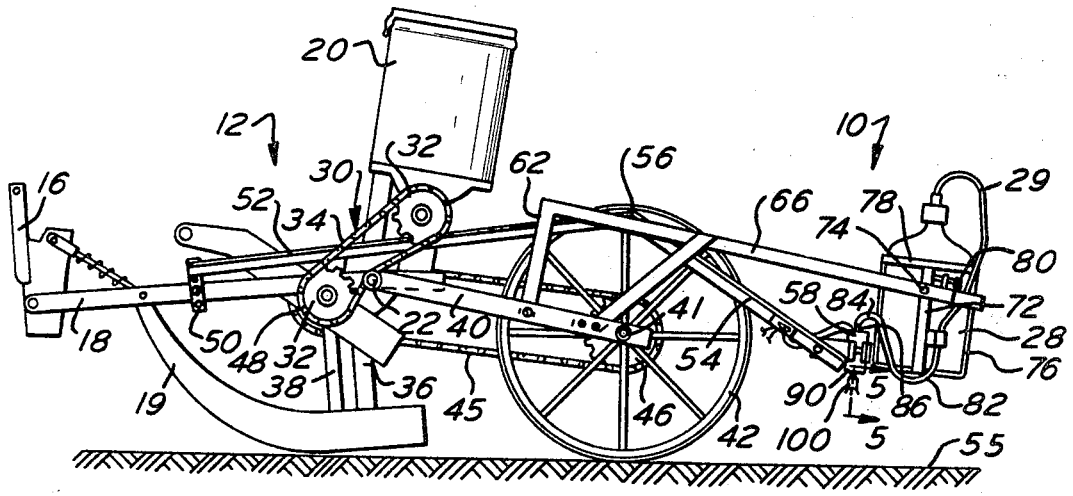
FIG. 2 is a view similar to FIG. 1A but wherein the planter is not moving such that the spray device has been turned off.

The motor 90 rotates the spindle 88 at a pre-determined constant rate, and a rotating spray head or spray means 98 depends from spindle 88 for rotation therewith in order to spray the liquid. Since the arrangement of FIG. 1 relies upon a siphoning action in order to deliver the liquid to the spindle 88, it is necessary that the discharge point from the feed means 29 be located below the bottom of the tank 28 for reasons that will be discussed hereinafter, and FIG. 1 should be so understood. It is to be understood that the spray device 10 of the present invention is adapted to be mounted upon or secured to many well known transport devices, such as a tractor. The planter 12 of FIGS. 1A, 2 and 3 is a standard planter that is known as the "John Deere planter" with details of construction that are well known in the art. Therefore, the description of the planter 12 will be limited to such details as are necessary to a clear understanding of the present invention.

The planter 12 is intended to be pulled by a tractor in a well known manner. It is the practice to secure several planters to a common pull bar which is in turn pulled by a single tractor. With the agricultural spray device 10 of the present invention secured to the planter 12, herbicide or other liquid is applied to the soil in the same operation wherein the planting of the seeds is effected by the planter 12. As shown in FIG. 1A, the planter 12 includes a hitching mechanism 16 which extends from draw bars 18 and a shoe 19 is provided for creating a furrow in the ground. A seed tank 20 extends upwardly from the draw bar 18 and there is a pivotal connection 22 on the draw bar 18 that will be discussed in greater detail.

In FIG. 1A, the planter 12 is being drawn by the tractor and concentrated herbicide is being sprayed as indicated at 24 in FIG. 1A. In FIG. 2, planter 12 is now stationary such that herbicide tank 28 has dropped or moved closer to the ground. A careful comparison of FIGS. 1A and 2 will reveal that the herbicide tank 28 in FIG. 2 is in a lower position than it is in FIG. 1A. In the lower position of FIG. 2, the siphoning action which delivers concentrated herbicide through hose 29 is halted by virtue of the lower position of the tank 28, and this will be discussed in greater detail.

Other features of planter 12 include drive mechanism 30 with sprockets 32 and small chain 34 for staggering the rate of seed distribution from the seed tank 20 through tube 36 and then to be dropped into the furrow created by shoe 19. An upright support 38 is provided for one of the sprockets 32.

A pair of rear bars 40 is provided with the forward ends thereof pivotally secured at 22 to the draw bars 18 with the two pivotal connections 22 being clearly shown in FIG. 3. It is this pivotal connection which allows the raising and lowering of the herbicide tank 28 as was previously discussed. The rear ends of the rear bars 40 are secured at 41 to the center of wheel 42 in a well known manner with the wheel 42 being secured between the rear bars 40 by means of axle 44 (FIG. 3), the ends of which are journalled in suitable bearings in the rear bars 40. A large chain 45 extends about a sprocket 46 which revolves together with the wheel 44 with such chain passing forwardly about a sprocket 48 which as shown in FIG. 3 extends just forwardly of smaller sprocket 32. It is seen that as wheel 42 revolves, the sprocket 46 also turns and this in turn drives the chain 45 to drive the sprocket 48 which is suitably connected to shaft 49 (FIG. 3) to one of the small sprockets 32. This in turn drives the seed distributing mechanism as was previously discussed.

Extending upwardly from draw bars 18 are angle brackets 50 to which are secured front braces 52 that extend rearwardly to pass outside of the wheel 42 as shown in FIG. 3 with rear portions 54 being connected at 56 to front braces 52. As shown in FIGS 1A and 2, the rear portions 54 are inclined downwardly towards the ground 56 and furnish support for the motor and spray head device 58 as will be discussed hereinafter. As shown in FIG. 3, a cross bar 60 is provided adjacent the rear ends of rear portions 54.

With further reference to FIGS. 1A and 2, a pair of risers 62 extend upwardly from rear bars 40 with the risers 62 being connected at their tops by link 64 (FIG. 3). A pair of tank supports 66 (FIG. 3) extend rearwardly from the connecting link 64 and pass about the tank 28 in end sections 68 and 70 as can be seen in FIG. 3. A strap 72 extends downwardly and beneath the tank 28 with the upper ends of the strap 72 being secured at 74 to the supports 66. Other suitable supports 76 and 78 are provided in order to hold the tank 28 with tightening bolts 80 being provided.

In view of the foregoing description, it can be seen that the motor and spray device 58 can be raised and lowered independently of the raising and lowering of the tank 28. These movements are readily seen by an inspection of FIGS. 1A and 2. The motor and spray device 58 is ultimately supported upon the draw bars 18 whereas the tank is ultimately supported upon the rear bars 40.

When the planter 12 is moving as in FIG. 1A, the draw bars 18 are almost coextensive with the rear bars 40. However, when the planter 12 is raised, the draw bars 18 as well as the rear bars 40 each pivot downwardly to the position of FIG. 2.

In other words, the draw bars 18 move in a counter-clockwise sense about the pivot point 22 whereas the rear bars 40 move in a clockwise sense about the pivot point 22. When the draw bars 18 pivot downwardly, the front braces 52 also move downwardly, but in view of the inclined nature of the rear portions 54, they move upwardly and hence the motor and spray device 58 moves upwardly with the rear portions 54. At the same time, the tank 28 moves downwardly with the downward movement of the rear bars 40. Hence in going from FIG. 1A to FIG. 2, the motor and spray device 58 moves upwardly whereas the tank 28 moves downwardly, the net effect being to lower the position of the liquid in tank 28 with respect to the motor and spray device 48. This will prevent further siphoning of concentrated herbicide until the motion of planter 12 is resumed. As will be discussed in greater detail, herbicide or other liquids will be delivered from the tank 28 at a constant pre-determined rate irrespective of the liquid level in tank 28 for reasons that will be described in detail hereinafter. However, it should be pointed out here that the constant head feature is a significant part of the present invention with reference being made to Waldrum pending application Ser. No. 592,397, filed Nov. 7, 1966, and entitled "Planter and Chemical Applicator."

When the planter 12 is again lowered into operating position, the tank 28 moves upwardly in relation to the motor and spray device 58 and the siphoning discharge of concentrated herbicide again begins. This is not to be confused with the constant head feature of the present invention. The aforesaid action is one example of "valving means" that is usable in connection with the present invention.

The details of the first embodiment of the present invention are basically the reservoir 28 with the constant head feature, as will be described hereinafter, with the tubing or conduit 29 leading the liquid in a siphoning action downwardly in a loop 82 and then upwardly in a bend 84 to drop down to a short length of tubing 86. The tubing 86 is somewhat more rigid than the more flexible tubing 29 with the tubing 86 telescoping axially into a rotatable hollow spindle 88, the lower end of which is visible in FIG. 5. A motor 90 drives the rotatable hollow spindle 88 about an axis. The motor 90 has electrical connections 92 and is supported in a bracket 94 with bolts 96 upon cross bar 60 as can be seen in FIG. 3. Secured to the lower end of the rotatable spindle 88 is a spray head 98 with discharge ports 100. It is to be noted that lower loop 82 will also hold some liquid when the siphoning action is stopped, and this held liquid helps to reinitiate the siphoning action.

The details of the constant head device will be discussed in connection with the second embodiment of the present invention, but to complete the description of FIGS. 1A to 5, reference is now made to the reservoir 28 which is preferably the shipping container for the agricultural liquid. As shown in FIG. 4, reservoir 28 has a threaded neck portion 102 which receives a cap 104 having suitable openings which permit the passage of tube 29 and an integral boss 106 without allowing seepage of air into tank 28 except through vent openings in boss 106. As seen in FIG. 4 boss 106 has threads that receive a cap 108 with a vent opening 110 and a suitably positioned air filter 112.

In operation, as the planter 12 is drawn along, concentrated herbicide or other agricultural liquid flows from the tank 28 through tubing 29 in a siphoning action to rigid tube 86 under constant head irrespective of the amount of liquid remaining in the tank 28. The concentrated herbicide under constant head is therefore delivered into rigid tubing 86 which in turn leads substantially axially into rotating hollow spindle 88 with the concentrated herbicide being discharged in a whirling spray through the spray head 98 and discharge ports 100. As shown in FIG. 4, tubing 114 extends downwardly from the boss 106. The tubing 114 actually extends adjacent the bottom of the tank much in the manner of FIG. 8. In this way, the constant head feature of the present invention is achieved as will be discussed in greater detail. The supply tubing 29 of FIG. 4 also extends adjacent the bottom of the tank 28 so that practically all of the herbicide liquid can be delivered from the tank 28.

By virtue of the constant head feature of the present invention, the concentrated herbicide or other liquid will be uniformly sprayed at low volumes in a coarse spray at all times. Thus, when the tank 28 is relatively full, the greater head usually experienced will be nullified. In a similar manner, when tank 28 is practically empty, the same head will be maintained. This is very important when dealing with agricultural liquid in concentrated form since the delivery of larger than necessary amounts of the concentrated herbicide or other liquid is not only wasteful, but larger amounts of a concentrated herbicide could produce undesirable effects. On the other hand, if substantially smaller amounts of the concentrated herbicide are delivered, the herbicide action may not be achieved. With the constant head feature of the present invention, a uniform controllable spray of relatively large particle size is achieved at all times.

Figure 6:
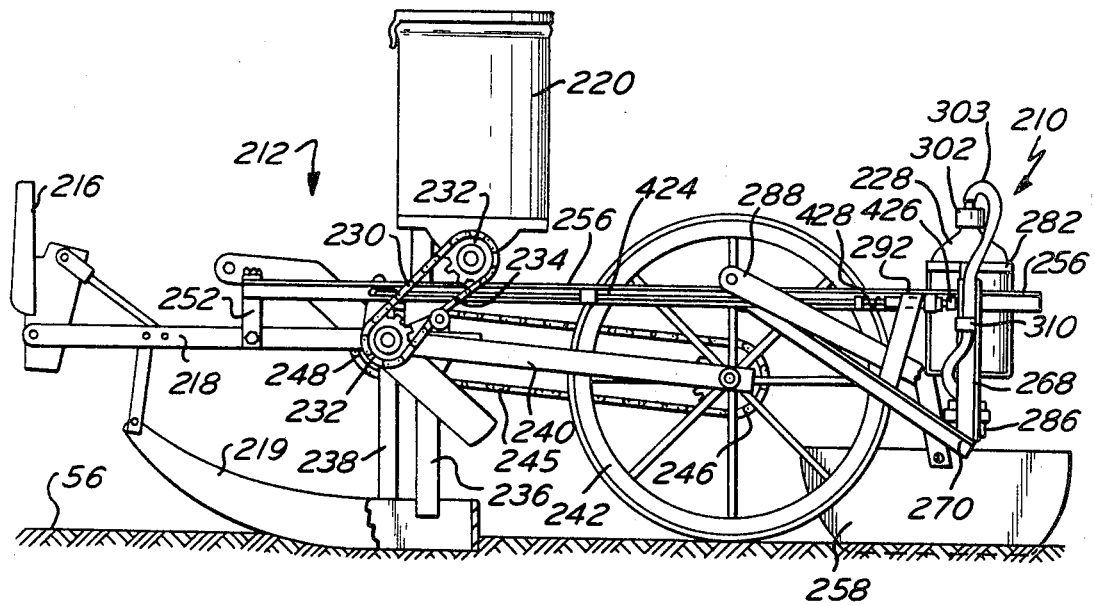
FIG. 6 is a view similar to FIG. 1A but showing a second embodiment of the concentrated herbicide spray device of the present invention fitted to a planter and having a mechanical shut-off device.

Referring now in greater detail to the second embodiment of the present invention as shown in FIGS. 6 to 12, attention is called to the concentrated herbicide spray device 210, which as shown in FIG. 6, is secured upon planter 212. The planter 212 has the same basic components as the planter 12. Thus, the planter 212 includes the hitching mechanism 216, the draw bars 218 with shoe 219 extending from the draw bars. There is also provided a seed tank 220 and a pivotal connection (not shown) similar to pivot 22 to allow the shoe 219 to be lifted as in FIG. 2. A tank or reservoir 228 is provided and supported in a manner as will be described hereinafter. There is also the drive mechanism 230 with sprockets 232 and chain 234 as well as tube 236 and upright support 238. Rear bars 240 and wheel 242 can be seen in FIG. 6 with an axle (not shown) similar to axle 44 being provided.

Figure 7:
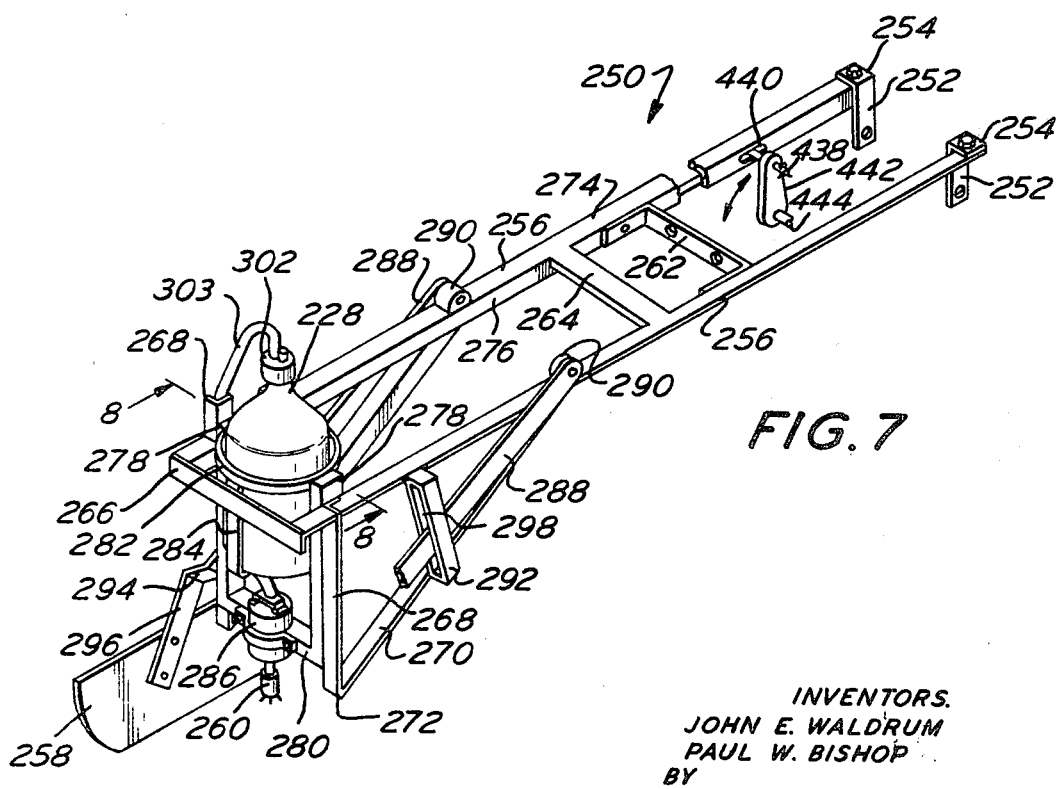
FIG. 7 is an enlarged perspective view of a frame which is so constructed as to be secured to a planter in the manner shown in FIG. 6 with certain portions removed for the sake of clarity.

The supporting frame for the tank 228 is best shown in FIG. 7 with reference being made to FIG. 6 to show how the frame 250 is fitted upon the planter 212. As shown in FIG. 7, the frame 250 includes short legs 252, the lower ends of which are bolted to one of the draw bars 218. The short legs 252 terminate in tabs 254 which are secured to long braces 256 which extend rearwardly for most of the length of the planter 212. As shown in FIG. 6, there is a windshield 258 on the far side of wheel 242 with the windshield 258 actually contacting the ground. A second windshield 258 (not shown) also extends from the frame 250 on the other side of the wheel 242 in substantially parallel relationship to the windshield 258 that is visible in FIG. 6. The two windshields 258 are substantally identical in construction, appearance and attachment to the frame 250. The windshields 258 prevent the wind from disturbing the spray pattern emanating from spray head 260 as will be discussed hereinafter.

As further shown in FIG. 7, the long braces 256 are held in parallel spaced relationship by means of U-shaped strap 262 and also connecting bar 264. As previously stated, the rear end of bracket 250 is supported by means of contact between the windshield 258 and the ground. As further seen in FIG. 7, the braces 256 extend rearwardly and are held together by end bar 266. Further structural support is provided by vertical bars 268 and inclined bars 270 which are welded together at lower edge 272 with the other ends thereof being secured by welding or otherwise to one of the long braces 256.

As shown in FIG. 7, the long braces 256 are actually angle pieces consisting of horizontal ledge 274 and vertical ledge 276. Welded or otherwise secured to the inner surfaces of the vertical ledges 276 are support bars 278 having integral lower cross member 280. Welded to the support bars 278 is a ring 282 from which depends a holding strap 284 that serves to support the tank 228. For this reason, the holding strap 284 first passes downwardly then beneath the tank 228 and finally upwardly again to join the strap 282. As also can be seen in FIG. 7, the cross member 280 furnishes support for the motor 286.

As further shown in FIG. 7, the windshields 258 are pivotally secured to the frame 250 by means of arms 288 which are inclined upwardly towards the braces 256. The upper end of an arm 288 is pivotally secured to the post 290 as also indicated in FIG. 8. The arm 288 extends downwardly through a guide means 292 which is welded to a brace 256. As the arm 288 inclines downwardly, it has an offset section 294 and a lower leg 296 to which the windshield 258 is attached. The offset section 294 permits the windshield 258 to be located outwardly of inclined bars 270, thereby eliminating any interference therewith. The guides 292 include elongated slots 298 which permit a considerable latitude of movement for the inclined arms 288 as the windshield 258 glide along the ground 256 which will almost always have considerable variations in height.

Reference is now made to the interior of reservoir 228 as best shown in FIG. 8 with certain details also being shown in FIGS. 9, 10 and 11. The tank 228 is preferably the shipping container for the concentrated herbicide or other liquid, and thus the tank 228 has the form of a container of conventional construction having a somewhat narrowed neck portion 300 with external threads to receive cap 302. As further shown in FIG. 8, the cap 302 has a pair of openings to permit the passage of discharge hose 303 with the second opening being provided for vent cap 307. As shown in FIGS. 6 and 8, the discharge conduit 303 is a part of the feed means which travels downwardly in a vertical section 306 and then a horizontal leg 308 to the motor or drive means 286, the concentrated herbicide or other liquid then being discharged through spinning spray head or spray means 260 as will be described in more detail hereinafter. It is to be noted that the left vertical bar 268, as viewed in FIG. 8, is slightly higher than the other vertical bar in order to receive vertical section 306 of the discharge hose as generally shown in FIGS. 7 and 8. A clip 310 is provided to give further support to vertical hose section 306.

The constant head feature of the present invention which was utilized in the first embodiment of the present invention and is briefly described in connection with FIG. 4 is illustrated in detail in FIG. 8 in connection with the second embodiment of the present invention. Reference is again made to application Ser. No. 592,397 and particularly to pages 7, 8 and 9 thereof which set forth the basic theory of constant head operation, and said pages are hereby incorporated by reference in the present application.

The theory of the constant head feature of the present invention can be understood through the use of two unopened cans of fruit juice or other liquid, so long as the cans remain unopened before the demonstration starts. The effect of the head of the liquid in the first can can be demonstrated by punching a hole in the top of the can to permit the entrance of air as the liquid is discharged through an opening in the bottom or in the side of the can along the bottom. It will be seen that the liquid will be discharged through the bottom opening in the normal manner such that in the early stages of discharge, the stream of liquid will shoot out for a considerable distance and then gradually diminish as the level of liquid in the can becomes less and less.

In the second can, a hole is also punched in the bottom or in the side near the bottom of the can. However, instead of punching the second hole in the top of the can, the second hole is punched in the side of the can, preferably a short distance above the first hole, for instance, an inch above the first hole. It will be seen that this time, the liquid discharge would be constant and this can be observed because the stream of liquid emerging from the bottom opening will extend out for a constant distance until such time as the level of liquid in the can reaches down to the upper opening in the side of the can. It will be further appreciated that the aforesaid constant discharge occurs because the atmospheric pressure acting through the upper opening presses upon a constant short head of liquid extending between the two openings. In other words, the atmosphere does not have an opportunity to press upon the entire height of the liquid in the can, and in this way, the effect of the varying height of the liquid in the second can is completely nullified.

The application of the foregoing principle to the present invention can be seen in FIG. 8 wherein the vent cap 307 or venting means in conjunction with sealing rings 312 and 314 prevents the entrance or seepage of air into the tank 228 except through openings in vent cap 307. In particular air can get into the tank 228 only through vent cap 307 which as shown in FIG. 10 possesses slits 316 and a protective filter 318.

It will be seen in FIG. 8 that the atmospheric air is forced to travel down the vent tube 320 and become effective as a driving force or head only at discharge slit or vent point 322 that is adjacent to the bottom of tank 228. As will be described hereinafter, the concentrated herbicide 324 is removed from the tank 228 in a siphoning action through feed means including discharge tubing 326 and then through conduits 303, 306 and 308, finally passing axially into the motor 286 to drop into rotating spray head 260 at delivery point 328 within the spray means 260 as shown in FIG. 11.

It will be seen that the true driving force or head upon the herbicide liquid 324 will be the difference in height between air slit 322 in vent tube 320 and point 328 within the spray means 260. This distance or driving force, of course, remains constant irrespective of the height or level of liquid 324 in tank 228. It is to be noted that the positioning of leg 308 of the discharge hose has no effect upon the distance between points 322 and 328, it being necessary only that the leg 308 be below the intake to discharge tubing 326 in order that the siphoning action may proceed. This is because siphoning action can proceed only so long as the discharge leg has a point lower than the lowest point of the intake leg. However, this does not have any effect whatsoever upon the constant head feature of the present invention, since siphoning action can proceed under a varying head or a constant head.

In order to initiate liquid flow it is desirable to create a small vacuum in the air space above the liquid herbicide in the tank 228. This is simply done by covering the slits in the vent cap and squeezing the flexible wall of tank 228, much in the manner of vacuum creation in said application Ser. No. 592,397 which is hereby incorporated by reference. When the flexible wall is squeezed some of the liquid is discharged and the space left by the liquid helps to establish the necessary vacuum, and the vent slits can be reopened. As liquid is hereafter discharged in a siphon action, the air bubbles into the tank through the vent opening and vent tube to replace the liquid.

It is to be noted that adjustment bolts and nuts 330 are provided which cooperate with slots 332 in support bars 278 in order to permit the height of tank 228 to be varied within the limits of the slots 332. It is seen that when the height of tank 228 is increased, greater constant head will be exerted since the height of point 322 will be increased with point 328 remaining at a constant height. Similarly, if the tank 228 is lowered, the concentrated liquid will be discharged under a lower constant head.

It is to be understood that the constant head feature is quite important in order to achieve uniform spraying of herbicide in accordance with the present invention. Since the use of concentrated herbicide greatly lowers the volume of liquid being sprayed, it can be seen that small changes in herbicide discharge rate cannot be tolerated. This is because a somewhat lower rate of concentrated herbicide discharge may be ineffective, whereas a somewhat higher rate may have undesired side reactions upon economic plants, and certainly will add unnecessarily to the cost of the operation.

With reference to FIG. 10, additional details of the venting system may be seen. In particular, a common plastic washer 334 is provided immediately beneath the horizontal inner surface of the bottle cap 302. As shown in FIG. 8, the plastic washer 334 extends completely beneath the cap 302 but possesses openings to permit the passage of the discharge hose 303 and the vent tube 320. As further shown in FIG. 10, the actual connection between the vent cap 307 and the venting hose 320 is accomplished by means of a brass fitting 338 which consists of a central body section 339 having a through opening 340 that is in communication with air space 342 in cap 307 as well as the air space in the bore of vent tube 320. The body 339 terminates at its upper portion in a head 344 with flange 346 being interposed between the lower edge of cap 307 and sealing ring 304. The body 339 terminates adjacent its lower end in an externally threaded section 348 and finally a tip 350 which is tightly engaged by the hose 320. The brass fitting 338 is tightly seated in place by means of tightening of nut 352 upon washer 354 which in turn presses upwardly on plastic insert 334, cap 302, sealing ring 314, and flange 346.

Reference is now made to FIG. 9 which shows the details of the concentrated herbicide delivery system as it originates inside of tank 228. Internal discharge tubing or conduit 326 terminates in lower end 356 which is positioned upon base 358 of a collector member 360 that sits upon the bottom of tank 228. In addition to base 358, the collector 360 includes conical side wall 362 which is truncated in shape to leave access opening 364. A filter 366 secured within the collector 360 and includes a central opening that allows the passage of tubing 326. Projecting outwardly from the side wall 362 are ridges 368 which aid in the channeling of liquid into the collector 360 when the tank 228 is almost empty such that the level of liquid has dropped below opening 364. Also secured to discharge tubing 326 is a tubular screen sleeve 370 which guides liquid into the collector 360 as the liquid level drops to the sleeve 370. It can be seen that once the liquid level has dropped to a point below the upper end 372 of the sleeve 370, that the vibrations and other movement emanating from the planter action will cause the liquid to swish about tank 228 in a fairly dynamic manner. As the liquid level drops further, the moving liquid will be tossed about more and more, and will at times contact the sleeve 370. When this occurs, the liquid tends to be held within the opening of the sleeve and then it will drain down into the collector 360.

The upper end 374 of the tubing 326 is connected to discharge conduit 303 by means of brass fitting 376. The upper end of fitting 376 includes a head 378 and flange 380 with sealing ring 312 being interposed between the flange 380 and the base of cap 302 as shown in FIG. 9. Immediately beneath the base of cap 302 is the plastic insert 334 which extends immediately below the horizontal inner surface of cap 302 across ubstantially its entire width as shown in FIG. 8. The fitting 376 is held in place by means of nut 382 and washer 384 with the lower end 386 of the fitting 376 having appropriate threads. Lower tip 388 of the fitting 376 is tightly received within the upper end 374 of discharge tubing 326 as shown in FIG. 9.

Referring now to FIGS. 8 and 11, the details of the substantially axial passage of herbicide liquid through motor 286 and into rotating spray means 260 will now be discussed. As shown in FIG. 8, the lower horizontal leg 308 of discharge conduit 303 fits about copper connecting leg 390 which has a vertical section 392 (FIG. 11) that is welded to a flange 394 of stationary sleeve 396 that is received within the boss 398 extending upwardly from a strap 400 that is secured by bolts 402 (FIG. 8) to housing 404 of motor 286.

Tightly fitted (using a seal if desired) within the bore 406 (FIG. 11) of the sleeve 396 is a small stationary delivery tube 408 which extends downwardly through the motor 286. Thus the concentrated liquid herbicide emerges at the lower tip 410 of the delivery tube 408 into discharge chamber 412 of the rotating spray means 260. As further seen in FIG. 11, the stationary delivery tube 408 passes downwardly through rotating hollow spindle 414 which rotates about an axis. The stationary delivery tube 408 or feed means may be regarded as telescoped within the rotating spindle 414 in a substantially concentric manner. In this way the feed means is disposed substantially in the rotational axis of spindle 414 and this does not disturb the constant head or other features of the invention so that low volume application can proceed with relatively large particles.

It is to be understood that the rotating spindle 414 is suitably connected to the motor or drive means 286 in such a manner that when the motor 286 is energized by a power source, that the rotation of motor 286 is conveyed by suitable gearing and couplings to the spindle 414 which is then rotated thereby.

A bearing 416 which may be of Delrin or other suitable plastic bearing material serves to support the stationary delivery tube 408, and at the same time, resists the wear of rotating spindle 414. In view of the possibility of slight leakage in the connection between delivery tube 408 and stationary sleeve 396, a guard 418 is secured to rotating spindle 414 so that any liquid seeping from the aforesaid connection will drain about the motor housing 404 of motor 286. Finally as shown in the lower portion of FIG. 11, the liquid is discharged from the delivery tube 408 into chamber 412 in the rotating spray head 260 which rotates along with rotating spindle 414. The concentrated liquid has now passed through spindle 414, the bore of which defines a flow path, and is now fed under constant head to the chamber 412, and then discharged upon ground 56 through ports 420.

It will be recalled in connection with the first embodiment of the present invention as shown in FIGS. 1 to 5, inclusive, that discharge of the concentrated liquid was prevented when the planter was stopped by valving means in the form of a relative dropping down of the tank 28 to hold siphoning action. In the second embodiment of the present invention as shown in FIGS. 6 to 12, discharge of liquid is prevented when the planter is stationary by valving means in the form of a stop mechanism 422 shown in FIG. 12. In particular, the stop mechanism 422 includes a long rod 424 which can be seen in FIG. 6 as extending immediately beneath a long brace 256. The long rod 424 extends rearwardly and terminates in a finger 426 that is in actual bearing contact with vertical leg 306 of the discharge conduit 303 as can be seen in FIGS. 6 and 8. The finger 426 is resiliently biased by means of spring 428 extending between collar 430 and sleeve 432. The collar 430 is fixedly mounted upon rod 424 by means of set screw 434. The sleeve 432 is held in place by means of a resilient washer 436 against which the finger 426 is positioned such that the bias of the coil spring 428 can be conveyed to the finger 426. The forward end of the long rod 424 terminates in a leg 438 which passes through slot 440 (FIG. 7) and received crank 442 that is actuated by a rod 444 that is coupled to one of the rear bars 240 (not shown).

It can be seen that when the draw bar 218 is lowered so that shoe 219 contacts the ground 56, the rod 444 through suitable connections will be rotated in a counterclockwise sense as viewed in FIG. 12. This in turn pulls rod 424 forwardly and thereby pulls finger 426 forwardly and away from substantial contact with vertical leg 306 of the discharge hose 303.

With the finger 426 moved from substantial contact with the supply hose, the liquid will be delivered downwardly through hose leg 306 and then into the motor 286, and this will continue so long as the shoe 219 is lowered into contact with the ground.

Should the shoe 219 be raised for any reason, as when the planter movement is stopped, the rod 444 is rotated in a clockwise sense as viewed in FIG. 12, and this moves the long rod 424 rearwardly so that finger 426 now strongly contacts under spring pressure the vertical leg 306 of the herbicide discharge hose, thereby pinching the discharge hose and preventing the further flow of herbicide liquid.

It is thus seen that the present invention provides a spray device which applied concentrated herbicide or other liquid to the ground or area to be treated at a pre-determined rate in a uniform manner irrespective of the amount of liquid remaining in the source of liquid supply or tank. Since concentrated herbicide is many times sprayed with the present invention, the volume of liquid systemic herbicide is relatively small. However, the present invention not only sprays in low volumes, but also does so in a coarse spray. This in turn substantially eliminates the problem of drift. It can be further appreciated that the present invention is relatively simple and economical in construction and maintenance.

It is to be further understood that it may be desirable to incorporate a valve at some point between the tank and spindle. Such a valve would be quick-acting and have a positive closing action. The construction of such valves is widely known, and the purpose of such a valve would be to achieve an instant shut-off where the operator reaches an area where the application of an agricultural spray would be undesirable.

It is to be also understood that other constructions and designs for the constant head means will now occur to those skilled in the art. For instance, a holding tank type of arrangement is envisioned wherein an overflow near the top of the tank is provided with means to continuously supply herbicide liquid to the holding tank in order to maintain a constant head on the tank at the overflow point with herbicide liquid being tapped from the tank at a lower point and delivered to the spray head.

While the present invention has been described with reference to a concentrated herbicide, it should be understood that many other types of concentrated liquids may be applied using the present invention. By way of example and non-limitation, the device of the present invention may be used to apply insecticides, pesticides, fungicides, nemiticides, fertilizer or any other liquid concentrate. Also, the present invention can be used in spraying low volumes of dilute liquids or solvent, should a coarse spray be desired.

For this reason, the term "agricultural spray" has been employed in the appended claims.

In order to demonstrate the effectiveness of the present invention in applying low volumes of concentrated herbicide, certain tests were conducted using Amiben as the herbicide with a sprayer constructed in accordance with the present invention. For the sake of comparison the same tests were run using a conventional atomizing sprayer. A comparison was also made under static air conditions and also with a six mile per hour cross-wind. In order to determine drift effects, tomato plants were set downwind from the respective sprayers at a distance of approximately three feet from the spray nozzle. In all cases a spray band having a width of ten inches was applied to the test flats. The results were as follows:

1. SPRAYER OF PRESENT INVENTION (PRE-EMERGENCE WEED CONTROL)

| Rate | Wind, m.p.h. | Ave. Percent Weed Control | | |
|---|---|---|---|---|
| | | Mustard | Pigweed | Crabgrass |
| 2 lbs./A | 0 | 87 | 100 | 100 |
| 2 lbs./A | 6 | 83 | 100 | 100 |
| 4 lbs./A | 0 | 95 | 100 | 100 |
| 4 lbs./A | 6 | 95 | 100 | 100 |

2. CONVENTIONAL ATOMIZING SPRAYER (PRE-EMERGENCE WEED CONTROL)

| Rate | Wind, m.p.h. | Ave. Percent Weed Control | | |
|---|---|---|---|---|
| | | Mustard | Pigweed | Crabgrass |
| 2 los./A | 0 | 45 | 65 | 60 |
| 2 lbs./A | 6 | 35 | 40 | 40 |
| 4 lbs./A | 0 | 85 | 90 | 90 |

In certain of the foregoing tests the Amiben was applied at a rate of 2 lbs. per acre, and this was accomplished at a volumetric rate of concentrated Amiben of 1 gallon per acre. Poorer weed control was obtained with the conventional sprayer as many of the fine spray droplets floated away. This drift was noticeable even under static air conditions and increased with a cross-wind. With the present invention there was no significant amount of drift even with the cross-wind in view of coarse particle formation.

Without further elaboration, the foregoing will so fully illustrate our invention that others may, by applying current or future knowledge, adopt the same for use under various conditions of service.

The embodiments of the invention in which an exclusive property or privilege is claimed are defined as follows:

1. A low volume, coarse particle size spray device for agricultural liquid, comprising in combination, a reservoir for said agricultural liquid, feed means to deliver said agricultural liquid from said reservoir under constant head via a conduit to a spindle, said spindle having a bore therein to define a flow path for said agricultural liquid, spray means depending from said spindle and drive means to rotate said spindle about an axis at a pre-determined rate, said feed means being disposed in the rotational axis of said spindle, such that said agricultural liquid is dispensed in a uniform manner.

2. The invention of claim 1, wherein said reservoir comprises an upright tank provided with two tubes extending through the mouth thereof to positions adjacent to the bottom of said tank, one of said tubes being open to the atmosphere and the other being connected to said feed means, and controllable valving means to prevent liquid flow.

3. The invention of claim 2 wherein the end of the tube connected to said feed means in said tank is stood in a collector and a portion of said tube is surrounded by a sleeve permeable to said agricultural liquid.

4. The invention of claim 1 wherein said spray device is mounted on a planter of the type having a shoe to cut a furrow such that agricultural liquid is caused to be sprayed when said shoe is in operation and prevented from being sprayed when said shoe is at rest.

5. The invention of claim 4 wherein the mechanism to raise and lower said shoe to cut a furrow includes a crank with an arm, the free end of which is reciprocably abuttable with said feed means at a point intermediate said reservoir and said spindle such that when said shoe is in operation, said free end of said arm is remote from said feed means and when said shoe is at rest, said free end abuts said feed means to cut off the flow of agricultural liquid.

6. The invention of claim 4 wherein said reservoir is mounted upon a bar connected to said planter and said spindle, spray means and motor are mounted on another bar connected to said planter and said feed means forms a flexible conduit therebetween such that when said shoe of said planter is at rest, said reservoir is sufficiently lower than said spindle to prevent the flow of agricultural liquid from said reservoir and when said shoe is in operation, said reservoir being sufficiently higher than said spindle to cause the flow of agricultural liquid from said reservoir to said spindle through said feed means.

7. The invention of claim 4 wherein said planter includes a pivotally mounted windshield which is spacedly positioned about said spray means.

8. The invention of claim 1 wherein said reservoir is a sealed tank with said constant head means being achieved by the provision of two tubes extending through said reservoir to positions adjacent to the bottom thereof, the first of said tubes being open to the atmosphere and the second of said tubes being connected to said feed means, said first tube terminating in a vent point adjacent to the bottom of said reservoir, said second tube extending outwardly of said reservoir to a discharge point below said vent point whereby the difference in height between said vent point and said discharge remains constant as liquid is discharged at a constant rate from said reservoir in a siphoning action.

9. The invention of claim 8 wherein the height of said reservoir is adjustable in order to vary the height of said vent point whereby said constant head may be changed in order to achieve a desired rate of liquid discharge from said spray means.

References Cited
UNITED STATES PATENTS

| | | | |
|---|---|---|---|
| 2,779,349 | 1/1957 | Ten Eyck | 137—145 |
| 3,044,712 | 7/1962 | Tanke | 239—155 X |

ABRAHAM G. STONE, *Primary Examiner.*

J. R. OAKS, *Assistant Examiner.*